United States Patent [19]

Widell

[11] 4,070,181
[45] Jan. 24, 1978

[54] METHOD FOR REDUCTION OF FINELY DIVIDED METAL OXIDE MATERIAL

[75] Inventor: Björn Widell, Vasteras, Sweden

[73] Assignee: Stora Kopparbergs Bergslags AB, Falun, Sweden

[21] Appl. No.: 633,845

[22] Filed: Nov. 20, 1975

[30] Foreign Application Priority Data

Dec. 12, 1974 Sweden .................... 7415578

[51] Int. Cl.² ............................................. C22B 5/14
[52] U.S. Cl. ...................................... 75/91; 75/26; 75/35; 75/36; 75/38; 75/82
[58] Field of Search ................ 75/26, 91, 34, 35, 42, 75/1, 36, 38, 82

[56] References Cited

U.S. PATENT DOCUMENTS

| | | | |
|---|---|---|---|
| 1,690,916 | 11/1928 | Westberg | 75/91 |
| 3,615,355 | 10/1971 | Skinner | 75/42 UX |
| 3,770,421 | 11/1973 | Celada et al. | 75/91 |
| 3,822,125 | 7/1974 | Roberts | 75/35 |
| 3,909,446 | 9/1975 | Miyashita | 75/42 |

OTHER PUBLICATIONS

APC Application of Schwier, SN 360935, Published May 4, 1943.

*Primary Examiner*—M. J. Andrews
*Attorney, Agent, or Firm*—Watson, Cole, Grindle & Watson

[57] ABSTRACT

In the reduction of finely divided material containing metal oxide in the presence of a carbonaceous material in a reactor, a gas containing molecular oxygen is supplied to the material and a gas mixture containing carbon monoxide, hydrogen, carbon dioxide and water is removed from the reactor. Part of the gas mixture is returned to the reactor unchanged, while another part is supplied with steam which is caused to react with the carbon monoxide to form carbon dioxide in the presence of a catalytic material. The carbon dioxide is removed from this part of the gas mixture and this part is returned to the reactor. The amount of steam supplied is sufficient to produce an amount of carbon dioxide in this part of the gas mixture, before the carbon dioxide is removed, which is at least as great as the total amount of carbon dioxide in those parts of the gas mixture removed from the reactor which are returned to the reactor.

3 Claims, 2 Drawing Figures

METHOD FOR REDUCTION OF FINELY DIVIDED METAL OXIDE MATERIAL

BACKGROUND OF THE INVENTION

1. Field of the Invention

The invention relates to a method for the reduction of finely divided metal oxide material by treatment in the presence of carbonaceous material with a gas containing molecular oxygen.

The reduction of materials containing metal oxide, for example iron ore, may be carried out on the material in finely divided solid form in the presence of a carbonaceous material, for example coal, and to which oxygen and air are supplied. The oxygen effects a partial combustion of the carbonaceous material so that the necessary reaction temperature is achieved, while at the same time reducing gases necessary for the reduction process are formed. The reduction may be a pre-reduction, for example a reduction or iron ore into a product with a degree of metallization of from 50 to 80%. The pre-reduced product thus obtained is then subjected in a second stage to a reduction in molten form so that all metal oxide is reduced.

2. The Prior Art

When the reduction described above is utilized for pre-reduction of iron ore, it may suitably be performed at a temperature of around 800° – 1100° C and advantageously in a reactor in the form of a fluidized bed. Iron ore and the carbonaceous material are normally continuously supplied to the reactor, as well as the oxygen or the air, whereas the reduced iron ore and gases which have been in contact with the iron ore are removed therefrom continuously. The removed gases contain reducing substances, such as CO and $H_2$, as well as oxidizing substances, such as $CO_2$ and $H_2O$. The gases also contain $N_2$ if air has been supplied to the reactor vessel. In order to utilize the contents of reducing substances in the gases, the contents of oxidizing substances may be removed in a washing plant and the remainder of the gases returned to the reactor. In connection with washing, the gas must be cooled to near room temperature and thereafter preferably be heated to temperatures in the vicinity of that of the reduction reactor. A washing plant for this purpose with supplementary devices for cooling and heating is very large.

SUMMARY OF THE INVENTION

According to the present invention it has proved possible not only to reduce the size of the washing plant, but simultaneously to achieve a considerably improved economy of the process.

The present invention relates to a method for reduction of a finely divided material containing metal oxide in the presence of a carbonaceous material in a reactor, to which the material containing metal oxide and the carbonaceous material as well as a gas containing molecular oxygen are supplied preferably continuously, and from which a reduction product of the metal oxide material and a gas mixture containing carbon monoxide, hydrogen, carbon dioxide and water are carried off preferably continuously, at least part of the gas mixture after removal of carbon dioxide and water being returned to the reactor and utilized for the reduction, characterised in that at least part of the gas mixture which is returned to the reactor is supplied with water, preferably in the form of superheated steam, and carbon monoxide in the water-added gas mixture is caused to react while forming carbon dioxide, whereafter carbon dioxide is removed from this gas mixture before the gas mixture is returned to the reactor.

According to one preferred embodiment of the invention, part of the gas mixture from the reactor with its contents of carbon dioxide and water is returned to the reactor. The part of the gas mixture which, according to this embodiment, is supplied with water suitably constitutes from 30 to 70% of the total amount of gas mixture which is returned to the reactor. The quantity of water supplied to the last-mentioned part of the gas mixture for achieving a conversion of $H_2O$ and CO into $H_2$ and $CO_2$ is preferably sufficient to produce an amount of carbon dioxide in this part of the gas mixture prior to the removal of carbon dioxide which is at least as great as the total amount of carbon dioxide in the parts of the gas mixture discharged from the reactor, to be returned to the reactor, before supplying water to the last-mentioned part of the gas mixture. In this way the advantage is gained that the required amount of carbon dioxide can be removed by washing only part of the gas mixture which is returned to the reactor, which makes it possible to use a smaller washing plant.

According to another embodiment of the invention, water is supplied to all the gas which is returned to the reactor. By reaction between carbon monoxide and water, the content of carbon dioxide in the gas mixture is thus increased. The increased content of carbon dioxide makes it possible to remove an amount of carbon dioxide, necessary for performing the process in the reactor, from the gas mixture in a simpler way than if the gas mixture would have had its original content of carbon dioxide, since a higher content of carbon dioxide can then be allowed in the washed gas mixture. The more incomplete washing of carbon dioxide from the gas mixture makes possible the use of a considerably smaller washing plant. At least the same quantity of carbon dioxide as the gas mixture returned from the reactor contains before the supply of water can in this way be removed from the gas mixture after the supply of water.

According to one embodiment of the invention, the carbon monoxide is caused to react into carbon dioxide in the presence of a metal oxide-containing material and/or carbonaceous material, which, after the reaction of the carbon monoxide, is/are supplied to the reactor to react in said reactor. In this way solid material for the practical performance of the oxidation of the carbon monoxide can be utilized in the reactor.

BRIEF DESCRIPTION OF THE DRAWINGS

The invention will be explained in more detail by way of examples with reference to the accompanying drawing, in which FIG. 1 and 2 schematically show devices for carrying out the method according to the invention.

DESCRIPTION OF THE PREFERRED EMBODIMENTS

Figure 1:
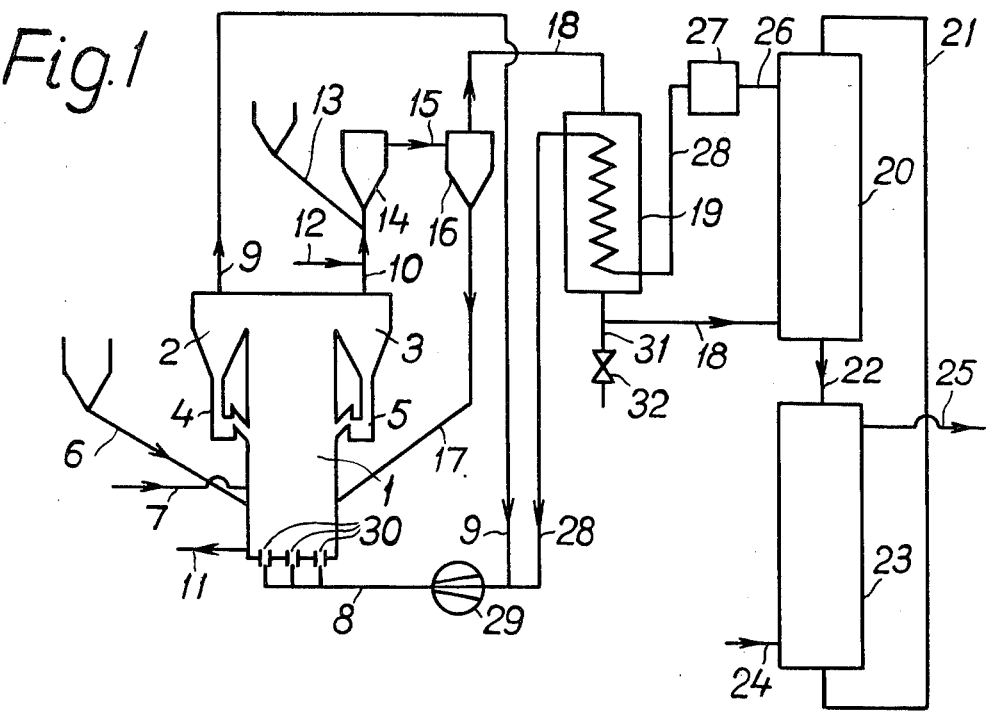

The device according to FIG. 1 comprises a circulating fluidized bed reactor, that is, a fluidized bed reactor with a recycling of material from a separating device which may be many times greater than the net flow of solid material through the bed. The reactor has a reaction chamber 1 and a separating device, in the example in the form of two cyclones 2 and 3 with return conduits 4 and 5. The circulating fluidized bed is maintained by conducting to the reaction chamber a flow of a finely divided material containing iron oxide, for example in the form of iron ore concentrate or calcined pyrites having a grain size of up to 1 mm, a flow of a finely divided solid carbonaceous material, for example in the form of coke breeze, anthracite breeze or coal breeze with a grain size of less than 3 mm which may possibly — at least partly — be replaced by a liquid carbonaceous material for example oil, a flow of a gas containing molecular oxygen, for example air, and a flow of a fluidizing gas. In the example, iron oxide-containing material and carbonaceous material are fed as a mixture into the same flow, designated 6 in the figure. The supplied quantity of carbonaceous material may, for example, constitute half the amount of iron oxide-containing material supplied. The gas flow containing molecular oxygen, in the example air, is designated 7 and the flow for the fluidizing gas is designated 8. The iron oxide-containing material, the carbonaceous material and the oxygen are supplied at a higher level in the reaction chamber, whereas the fluidizing gas is supplied at the bottom of the reaction chamber. The oxygen effects a partial combustion of the carbonaceous material, which results in a temperature of 700° – 1100° C being maintained in the reaction chamber. In this also a possible coking and degassing of the carbonaceous material take place, as well as a reduction of carbon dioxide and water, formed during the combustion, into carbon monoxide and hydrogen, which last-mentioned substances achieve a reduction of the iron oxide material. The solid material in the bed and the formed gases are separated in the cyclones 2 and 3. The gases are discharged through the pipes 9 and 10, whereas the solid material is returned to the reactor chamber through the return conduits 4 and 5, respectively, with discharge ends in the vicinity of the supply spot for the air in the reactor chamber. Pre-reduced material containing coke is fed out into a flow 11 from the reaction chamber's bottom and then passes on to a final reduction e.g. in an electric furnace at a temperature exceeding the melting temperature of the iron. The pressure in the fluidized bed reactor is suitably from 1 to 25 atmospheres.

The gas mixture discharged from the fluidized bed reactor contains carbon monoxide, hydrogen, carbon dioxide, water and nitrogen, that is, both reducing and oxidizing substances. According to the embodiment of the invention exemplified here, a partial flow, designated 9 in the exemplified case, is returned to the reaction chamber without being treated, whereas another partial flow 10 is subjected to treatment for converting carbon monoxide into carbon dioxide, while at the same time forming hydrogen, and thereafter removing the carbon dioxide from this partial flow.

A flow 12 of water steam and a flow 13 of iron oxide-containing material and/or carbonaceous material and/or iron-containing material are supplied to the partial flow 10. The partial flow 10 with supplied materials is first conducted through a venturi tube 14 and from there through the connection 15 to a cyclone 16, where the solid material is separated and returned to the reaction chamber 1 of the fluidized bed reactor via the connection 17, whereas the gas is carried off as the flow designated 18. Upon contact between the gas mixture from the reactor, the water steam and the solid material supplied, whereby a temperature of 800° C is maintained, carbon monoxide reacts with water steam while forming carbon dioxide and hydrogen. The amount of water steam supplied is sufficient for the amount of carbon dioxide in the gas flow 18 to be at least as great as the amounts of carbon dioxide in the gas flows 9 and 10 together. After cooling the gas in the heat exchanger 19, the carbon dioxide is washed out in a washing device 20, to which in the example potassium carbonate is supplied from the connection 21. The potassium bicarbonate departing from the device 20 through the connection 22 can be regenerated into potassium carbonate in a device 23 by treatment with water steam, which is supplied at the lower part 24 of the device. A mixture of carbon dioxide and water steam is then discharged at the top part 25 of the device. The gas 26 discharged from the device 20 is freed from water in the cooler 27. After passing the device 27 the gas — the gas flow there being designated 28 — contains in comparison with the gas 10 discharged from the reactor a strongly reduced content of carbon monoxide and carbon dioxide and a strongly increased content of hydrogen. Thereafter the gas is heated in the heat exchanger 19 before it joins the gas flow 9 into the gas flow 8. The gas flow 8 is blown after increasing the pressure in the device 29, into the bottom of the reaction chamber 1 of the fluidized bed reactor through openings 30 located there. The gas thus serves as a fluidizing gas and at the same time, because of its composition, as a reducing gas. To prevent nitrogen gas, which is supplied to the reactor when using air for the oxygen supply, from accumulating in the system, a discharge of gas must be arranged from either of the two partial flows. This can be done by using a conduit 31 provided with a valve 32. Simultaneously with the nitrogen gas, other gases are of course carried off from the partial flows to a corresponding degree. Carbon monoxide and hydrogen gas discharged through conduit 31 can be utilized by combustion in a steam boiler.

Figure 2:
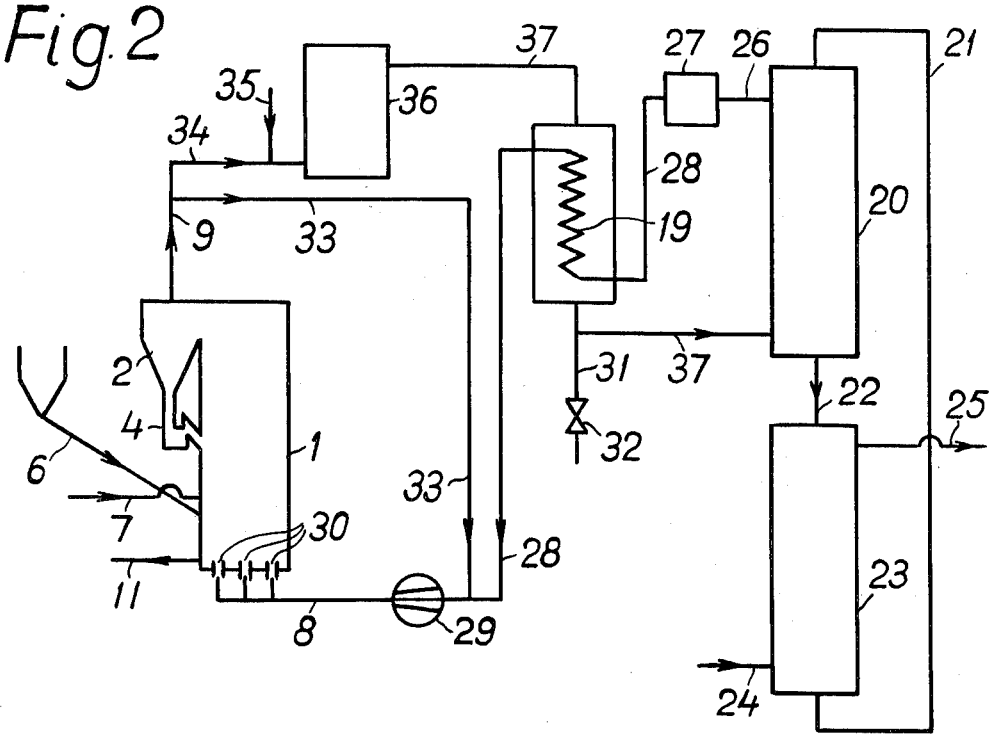

In the device according to FIG. 2 the designations from the device according to FIG. 1 have been maintained for elements corresponding to each other. As is clear from the figure, the device contains only one cyclone 2. The gas flow 9 discharged from this is divided into two partial flows 33 and 34, respectively, the first one being returned to the fluidized bed reactor without treatment, that is, with its contents of carbon dioxide and water. To the second partial flow 34 there is supplied water steam in the form of the flow 35, whereafter this partial flow is conducted through a bed 36 of solid material, for example a suitable catalyst, e.g. chromiumiron-catalyst. In the bed a temperature of 400° – 800° C is maintained, and in there carbon monoxide reacts with water steam while forming carbon dioxide and hydrogen. The gas flow 37 discharged from the bed 36 is then treated in the same way as has been described for the gas flow 18 in the device according to FIG. 1 before it is returned to the fluidized bed reactor.

Instead of a fluidized bed reactor, other reactors may be used in the devices according to FIGS. 1 and 2, inter alia rotating furnaces.

The invention has been described in detail for the case when the metal oxide-containing material consists of an iron-oxide-containing material, but it can also be applied in the reduction of other metal oxide-containing materials, for example nickel oxide.

For performing the embodiment of the invention when all gas returned to the reactor is supplied with water, a device corresponding to FIG. 1 may be used, in which the conduit 9 is connected to the conduit 10, or a device corresponding to FIG. 2, in which conduit 33 is omitted.

Part of the gas mixture from the reactor 1 may, of course, be conducted, for example, to a thermal power plant to be utilized as fuel, another part being recycled to the reactor in the manner described above.

I claim:

1. Method for reduction of finely divided material containing metal oxide in the presence of carbonaceous material in a reactor, comprising the steps of:
supplying material containing metal oxide and carbonaceous material and a gas containing molecular oxygen to the reactor;
removing from the reactor a reduction product of the material containing metal oxide and a gas mixture including carbon monoxide, hydrogen, carbon dioxide and water;
returning a portion of said gas mixture to said reactor;
treating the remaining portion of said gas mixture with water-steam causing the carbon monoxide in said gas mixture to react to form carbon dioxide and hydrogen; and
removing carbon dioxide from the treated gas mixture and returning the remaining gas mixture to said reactor.

2. The method as in claim 1 wherein said step of treating said gas mixture includes the addition of a carbonaceous material and subsequently separating said carbonaceous material from said gas mixture and returning said carbonaceous material to said reactor.

3. A method as in claim 1 wherein the amount of water-steam supplied to said gas mixture is sufficient to generate an amount of carbon dioxide in the portion of said gas mixture that is treated to be at least as great as the amount of carbon dioxide in the untreated gas mixture and the treated gas mixture prior to said step of treating.

* * * * *